US006961492B2

(12) United States Patent
Doerr

(10) Patent No.: US 6,961,492 B2
(45) Date of Patent: Nov. 1, 2005

(54) TUNABLE DISPERSION COMPENSATOR

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 23 days.

(21) Appl. No.: 10/760,516

(22) Filed: Jan. 20, 2004

(65) Prior Publication Data

US 2005/0058398 A1 Mar. 17, 2005

Related U.S. Application Data

(63) Continuation-in-part of application No. 10/664,340, filed on Sep. 17, 2003.

(51) Int. Cl.[7] ............................ G02B 6/26; H04B 10/12

(52) U.S. Cl. ........................... 385/39; 398/147; 385/15; 385/27

(58) Field of Search ............................... 385/39, 15, 40

(56) References Cited

U.S. PATENT DOCUMENTS

| | | | | |
|---|---|---|---|---|
| 5,247,594 A | * | 9/1993 | Okuno et al. | 385/17 |
| 6,782,205 B2 | * | 8/2004 | Trisnadi et al. | 398/94 |
| 6,785,446 B1 | * | 8/2004 | Chandrasekhar et al. | 385/39 |
| 6,807,372 B1 | * | 10/2004 | Lee et al. | 398/78 |
| 6,842,547 B2 | * | 1/2005 | Bulow | 385/14 |
| 6,853,756 B2 | * | 2/2005 | Gerlach et al. | 385/1 |
| 2003/0053167 A1 | * | 3/2003 | Xu | 359/124 |
| 2003/0053174 A1 | | 3/2003 | Rosenfeldt | 359/161 |

FOREIGN PATENT DOCUMENTS

EP 1 176 439 A1 1/2002

OTHER PUBLICATIONS

J. Gehler, R. Wessel, F. Buchali, G. Thielecke, A. Heid, H. Blow, "Dynamic Adaption of a PLC Residual Chromatic Dispersion Compensator at 40 Gb/s" in OFC 2003, vol. 2, pp. 750–751.

Doerr C. R. et al "Potentially inexpensive 10–Gb/s tunable dispersion compensator with low polarization sensitivity" IEEE Photonics Tech. Letters, vol. 16, No. 5, May 5, 2004, pp. 1340–1342.

* cited by examiner

*Primary Examiner*—Frank G. Font
*Assistant Examiner*—Charlie Peng

(57) ABSTRACT

A method and apparatus for implementing a colorless polarization independent Mach-Zehnder-interferometer (MZI)-based tunable dispersion compensator (TDC) that has only three MZI stages (two in a reflective MZI-TDC) and two adjustable couplers which are responsive to one control voltage, making it compact, low power, and simple to fabricate, test, and operate. Polarization independence is obtained by using a half-wave plate positioned across the midpoints of the two path lengths of middle stage MZI of the three stage MZI-TDC and by using a quarter-wave plate in front of a reflective facet of the reflective MZI-TDC. A cascaded MZI-TDC arrangement with also only a single control is formed by cascading two MZI-TDC arrangements and driving all adjustable couplers with the same control signal.

14 Claims, 5 Drawing Sheets

TUNABLE DISPERSION COMPENSATOR

REFERENCE TO PARENT APPLICATION

This is a continuation-in-part of co-pending patent application identified as C. R. Doerr 79, Ser. No. 10/664,340, filed Sep. 17, 2003.

TECHNICAL FIELD OF THE INVENTION

This invention relates generally to optical dispersion compensators and, more particularly, to a method and apparatus for implementing a colorless Mach-Zehnder-interferometer-based tunable dispersion compensator.

BACKGROUND OF THE INVENTION

Optical signal dispersion compensators can correct for chromatic dispersion in optical fiber and are especially useful for bit rates 10 Gb/s and higher. Furthermore, it is advantageous for the dispersion compensator to have an adjustable amount of dispersion, facilitating system installation. It is also advantageous if the tunable dispersion compensator (TDC) is colorless, i.e., one device can compensate many channels simultaneously or be selectable to compensate any channel in the system.

Previously proposed colorless TDCs include ring resonators[1], the virtually imaged phased array (VIPA)[2], cascaded Mach-Zehnder interferometers (MZIs)[3,4,5], temperature-tuned etalons[6], waveguide grating routers (WGRs) with thermal lenses[7], and bulk gratings with deformable mirrors[8]. The bracketed references[ ] refer to publications listed in the attached Reference list. The cascaded MZI approach is particularly promising since it exhibits low loss, can be made with standard silica waveguides, and can be compact. However, most previous MZI-based TDCs required 8 stages and 17 control voltages in one case[3] and 6 stages with 13 control voltages in two others[4, 5]. This large number of stages and control voltages is expensive and power-consuming to fabricate and operate, especially when compensating 10 Gb/s signals. Because fabrication accuracy cannot guarantee the relative phases of such long path-length differences, every stage of every device must be individually characterized. Also, a large number of stages often results in a high optical loss and a large form factor. Additionally, the more the stages, the more difficult it is to achieve polarization independence.

One previous MZI-based TDCs required only 3 stages and 2 control voltages and also included power monitoring and phase shifters to control power levels.[5A]. That device was designed to compensate 40-Gb/s signals. However, a 10-Gb/s version, because of typical birefringence in planar lightwave circuits, would likely have significant polarization dependence. This is because the path-length differences in the MZIs are 4 times longer for a 10-Gb/s version than a 40-Gb/s version, and thus the 10-Gb/s version is significantly more sensitive to birefringence.

What is desired is a polarization-independent simplified MZI-based TDCs having a reduced number of stages and control voltages.

SUMMARY OF THE INVENTION

In accordance with the present invention, I disclose a method and apparatus for implementing a colorless polarization independent Mach-Zehnder-interferometer (MZI)-based tunable dispersion compensator (TDC) that has only three MZI stages (two in a reflective version) and two adjustable couplers which are responsive to one control voltage, making it compact, low power, and simple to fabricate, test, and operate. Polarization independence is achieved using a half-wave plate positioned across the midpoints of the two path lengths of middle stage MZI to exchange the TE and TM polarizations. Such an MZI-based TDC with a 25-GHz-free-spectral-range version can compensate~±2100 ps/nm for 10 Gb/s signals. Having a free-spectral range equal to the system channel spacing divided by an integer makes it possible for the TDC to compensate many channels either simultaneously and also compensate the case where the wavelength is jumping between different channels without adjustment of the TDC. For example, the 25 GHz free-spectral range, as well as the free-spectral ranges 20 GHz and 33.3 GHz, will allow for the TDC to compensate multiple channels on a 100-GHz grid More particularly, one embodiment of my tunable chromatic optical signal dispersion compensator comprises a first MZI including a fixed 50/50 coupler for receiving an input optical signal, a second MZI including a first adjustable coupler that is shared with the first MZI and a second adjustable coupler that is shared a third MZI, the second MZI further including a half-wave plate positioned across the midpoints of the two path lengths of the second MZI so as to exchange the TE and TM polarizations of the optical signals passing through the two path lengths, the third MZI including a fixed 50/50 coupler for outputting a dispersion-adjusted output optical signal and wherein said first and second shared adjustable couplers are adjusted with equal coupling ratios using a single control signal to provide adjustable dispersion compensation to the output signal.

In a reflective embodiment, my tunable chromatic optical signal dispersion compensator comprises a first MZI including a fixed 50/50 coupler for receiving an input optical signal at a first port and an adjustable coupler, that is shared with a second reflective MZI, the path-length difference between the two arms in the second MZI is equal to that of the first MZI and wherein the adjustable coupler is responsive to a control signal for controlling the amount of signal dispersion added by said compensator to the input optical signal to form the output optical signal. If polarization independence is desired, a quarter-wave plate is positioned in front of the reflective facet of the second reflective MZI.

In another embodiment, a polarizationindependent cascaded MZI-TDC arrangement is formed by cascading a first three-stage MZI-TDC with an second three-stage MZI-TDC with a half-wave plate between the two TDCs.

In yet another embodiment, a double-pass MZI-TDC arrangement is formed by placing a reflector after the TDC such that the signal passes through the TDC twice. This double-pass increases the amount of achievable dispersion. If polarization independence is desired, a quarter-wave plate can be placed between the TDC and the reflector.

BRIEF DESCRIPTION OF THE DRAWINGS

The present invention will be more fully appreciated by consideration of the following Detailed Description, which should be read in light of the accompanying drawing in which.

In the following description, identical element designations in different figures represent identical elements. Additionally in the element designations, the first digit refers to the figure in which that element is first located (e.g., 101 is first located in FIG. 1).

DETAILED DESCRIPTION

Figure 1:
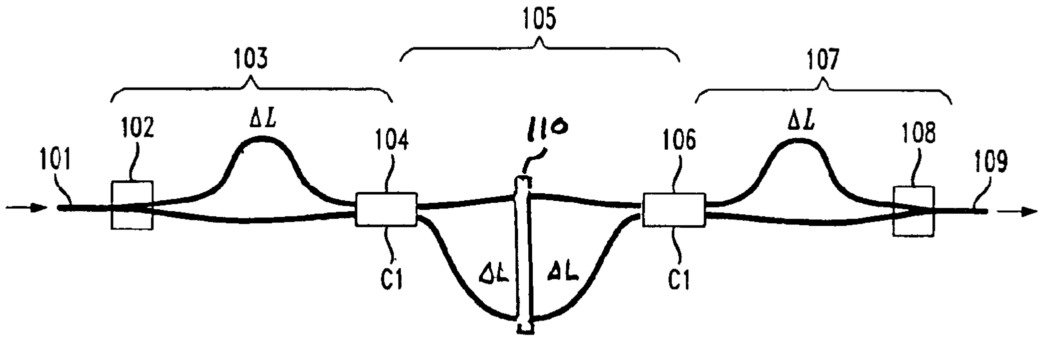
FIG. 1 illustrates, in accordance with the present invention, a polarization independent tunable dispersion compensator (TDC) has only three stages, including a center stage having a half-wave plate, and one TDC control voltage.
Figure 10:
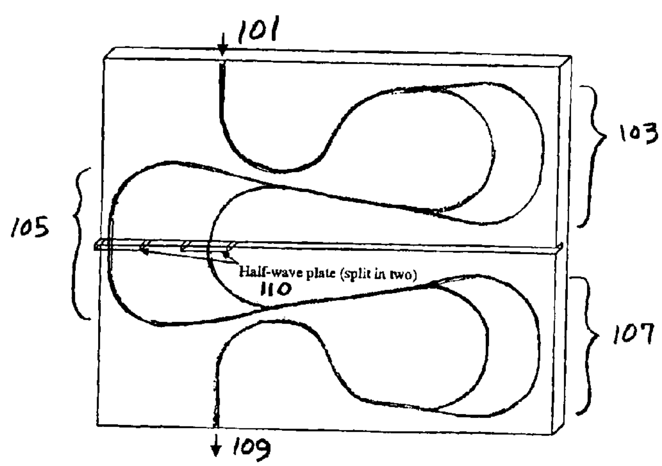
FIG. 10 shows a compact waveguide layout of the TDC of FIG. 1.

With reference to FIG. 1 there is shown, in accordance with the present invention, an illustrative diagram of my polarization independent tunable dispersion compensator (TDC) device that has only three stages and uses one control voltage. The three stages 103, 105, and 107 are implemented using Mach-Zehnder-interferometers (MZIs). The first and second MZIs 103, 105 share an adjustable coupler 104 and the second and third MZIs 105, 107 share an adjustable coupler 106. The two adjustable couplers 104, 106 are always set equally. The first and third MZI have path-length differences ΔL, and the center MZI has a path-length difference of 2ΔL (plus any phase offset from the couplers). Note that in the preferred embodiment shown in FIG. 1, the longer path-length is located in the top, bottom, and top arms of the first, second and third MZIs, 103, 105, 107, respectively. This allows the structure to be folded into a compact arrangement as shown in the waveguide layout of FIG. 10. Alternatively, the longer path-length could be located in the top arm of the first, second and third MZIs.

My polarization independent TDC is achieved in a cost-effective and low loss approach by placing a half-wave plate 110 in the center of the TDC device (center of second MZI 105). A half-wave plate 110 refers to a thin birefringent waveplate that gives a differential phase shift between orthogonal polarizations of 180° The waveplate birefrefirngent axes are oriented at 45° to the plane of the lightwave circuit. Takahashi, et. al., were the first to use a half-wave plate, made of quartz, in a groove in the center of a symmetric waveguide device to achieve low polarization sensitivity[5C]The half-wave plate 110 exchanges the signals in the TE and TM polarizations in the TDC device center, so if the device is symmetric (as in FIG. 1), and there is no polarization coupling between TE and TM elsewhere in the TDC device, polarization dependence is eliminated. Later Inoue, et al., developed a polymide half-wave plate for polarization-dependence reduction, which is only 15-$\mu$m thick and not brittle like quartz[5D]. For a TDC device consisting of a series of interferometers, one must generally insert a waveplate in the middle of every interferometer; Takiguchi inserted five waveplates into a five-stage MZI-type TDC to achieve low polarization sensitivity[5E]. Undesireably, the insertion of this many waveplates adds significant cost and loss.

Figure 5A:
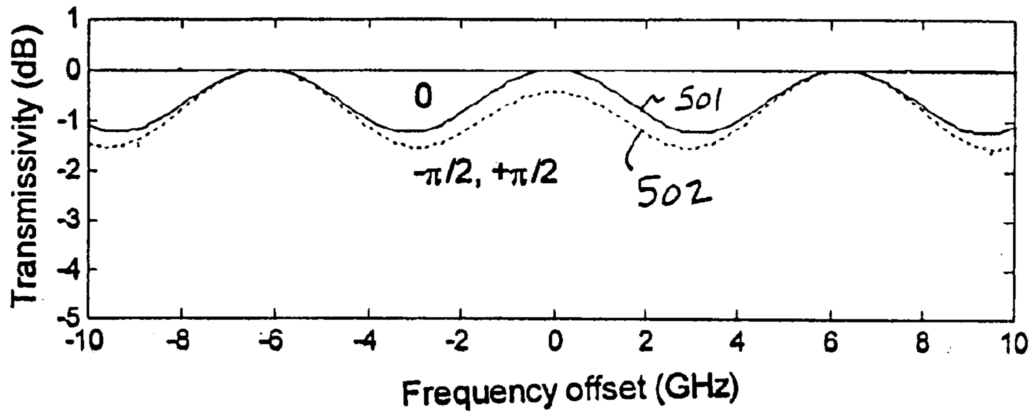
FIGS. 5A and 5B illustratively show the transmissivity and group-delay characteristics of my TDC at three different settings of the adjustable coupler(s) and also shows the effects of polarization-dependent wavelength shift in the two outer MZIs.
Figure 5B:
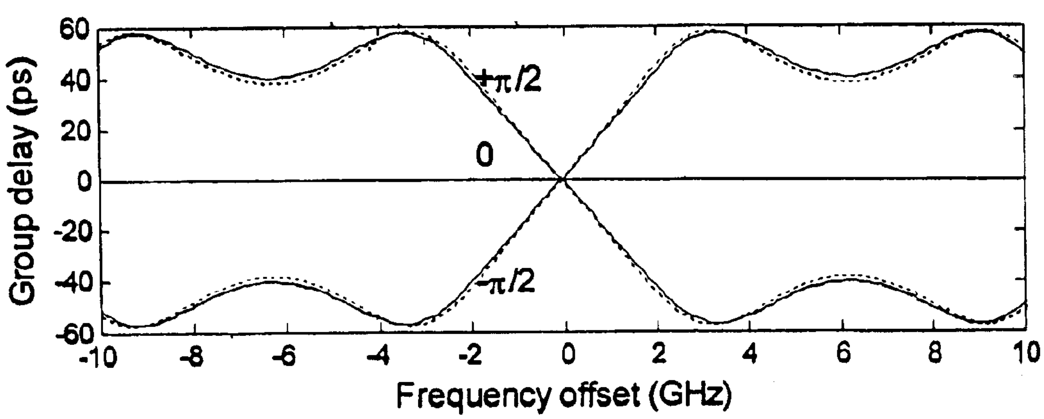

As noted previously, unfortunately the silica waveguide arms of the length-imbalanced MZIs 103, 105, 107 exhibit a stress-induced birefringence, causing the accumulated phase difference in length-imbalanced MZIs to be different for transverse-electric (TE) and transverse-magnetic (TM) polarized lightwaves. For example, the TDC for a 10 Gb/s signal with a free-spectral range of 25 GHz requires a path-length difference>1.6 cm, making the TDC PLC highly polarization dependent, even if I use waveguides with state-of-the-art PDW for silica-on-silicon of 20 pm[5B]. This results in a polarization-dependent wavelength shift (PDW) in the MZIs 103, 105, 107. I have recognized that if I make the entire TDC device symmetric, as in FIG. 1, only one half-wave plate 110 is needed to remove the polarization dependence. Thus, for example if the TE polarized lightwave travels through MZI 103 and the first half, 105A, of MZI 105, the half-wave plate 110 rotates the TE polarized lightwave so that it becomes the TM polarized lightwave through the second half, 105B, of MZI 105 and MZI 107. Conversely, if the TM polarized lightwave travels through MZI 103 and the first half, 105A, of MZI 105, the half-wave plate 110 rotates the TM polarized lightwave so that it becomes the TE polarized lightwave over the second half, 105B, of MZI 105 and MZI 107. As a consequence, there is no differential PDW between the TE and TM polarized lightwaves as they pass through MZIs 103, 105, 107. Additionally because of the symmetry, the waveplate 110 in my design even cancels out coupler and phase-shifter polarization dependencies, unlike the general cascaded MZI TDC. Note that the PDW in the outer MZIs 103 and 107 minus an integer number of TDC free-spectral ranges cannot be too large, otherwise the outer MZIs will be wavelength-misaligned when the half-wave plate 110 is inserted. Fortunately, the performance is rather insensitive to this misalignment, and FIGS. 5A and 5B compare the simulated transmissivity and group delay for the perfect case 501, and the misaligned case, 502, where the outer MZIs 103, 107 are misaligned by 20 pm in a 25-GHz-free-spectral-range range device. As shown by 502, a small frequency offset between the outermost MZIs results in mainly a higher loss.

My polarization independent TDC is shown in FIG. 1. It consists of three MZIs 103, 105, and 107 coupled together with two adjustable couplers 104 and 106, each made of a small MZI, that are always set equally. When the phase shifters (of couplers 104 and 106) are not driven, the adjustable couplers 104 and 106 are 100/0, and the device looks like a large length-balanced interferometer, having unity transmission and flat group delay over all wavelengths. When both upper phase shifters (e.g., 202 of FIG. 2) are driven together, the couplers are tuned toward 50/50, and MZI 103 act like a demultiplexer and MZI 106 acts like a multiplexer, splitting the light so that shorter wavelengths predominantly travel the longer path of the center MZI, giving negative dispersion. It is vice-versa for driving the two lower phase shifters (e.g., 203 of FIG. 2). When the adjustable couplers 104 and 106 are exactly 50/50, the design is similar to the fixed birefringent crystal dispersion compensator of Ref. [9].

A more detailed description of the dispersion compensating TDC of FIG. 1 is as follows. An input optical signal at port 101 is split equally to the two arms of the first MZI 103 by the y-branch coupler 102. In the first MZI 103, one arm is longer, by ΔL, than the other arm so that when the optical signals are recombined in the first adjustable coupler 104, the amount of light sent to each of the two arms of the second MZI 105 depends on the wavelength. The first adjustable coupler 104 in response to a control signal C1 controls the sign and amount of dispersion introduced to the signals outputted from the coupler 104 to the arms of the second MZI 105. Similarly, the second adjustable coupler 106 in response to a control signal C1 controls the sign and amount of dispersion introduced to the signals received from the arms of the second MZI 105 and outputted from the coupler 106 to the arms of the third MZI 107. If negative dispersion is desired, a predetermined control signal C1 to adjustable couplers 104, 106 is used to enable the shorter wavelengths to predominantly travel the longer arms of the second MZI 105. If positive dispersion is desired, a predetermined control signal C1 to adjustable couplers 104, 106 is used to enable the longer wavelengths to predominantly travel the longer arms of the second MZI 105. The third MZI 107 then performs a function similar to the first MZI in that the wavelengths on its arms are recombined in the final y-branch coupler 108 and are sent to the output port 109.

Note that when the TDC device is set for zero dispersion, the two adjustable couplers 104, 106 are 100/0 (i.e., the couplers perform a simple cross-connect function—an input to the upper left-hand port of the adjustable coupler goes to the lower right-hand output port of the adjustable coupler and vice versa). In such a zero-dispersion case, the optical signals through the TDC traverse equal path lengths. While only the differential arm lengths are shown in FIG. 1, in MZIs 103 and 107, the actual arm lengths are L+ΔL and L and in MZI the actual arm lengths are L+2ΔL and L. Thus, the signal path from one output port of y-branch coupler 102 to the output port 109 of y-branch coupler 108 follows a path of length L+ΔL through MZI 103, L through MZI 105, and L+ΔL through MZI 107, giving a total length of 3L+2ΔL; and the other path consists of L, L+2ΔL, and L, also giving a total length of 3L+2ΔL. Thus for the zero dispersion setting, the TDC device acts simply as a waveguide of length 3L+2ΔL and so introduces no significant chromatic dispersion.

In the above description □L determines the free spectral range (FSR) of the TDC. The FSR is equal to $$FSR=C_0/(\Delta L\cdot n_g)$$

Where $C_0$ is 300 km/s (vacuum speed of light)

$n_g$ is the group refractive index of the MZI waveguides.

In one illustrative design, for an optical signal data rate of 10 Gb/s, the FSR would be about 25-GHz. Such an MZI-based TDC with a 25-GHz-free-spectral-range version can compensate~±2100 ps/nm for 10 Gb/s signals. In a multi-wavelength channel system, having a FSR equal to the system wavelength channel spacing divided by an integer makes it possible for the TDC to compensate many channels simultaneously. Thus, my TDC is colorless, i.e., it can compensate many channels simultaneously or be selectable to compensate any channel in a multi-wavelength channel system. Other reasonable choices for the FSR include 20 GHz and 33.3 GHz to compensate 10 Gb/s channels with a 100-GHz-spaced channel wavelength grid.

In a well-known manner, MZIs 103, 105, 107 may be implemented together as a planar optical integrated circuit or may be implemented using discrete optical elements mounted on a substrate.

The dispersion of TDC can be tuned positive or negative by adjusting couplers 104 and 106 toward 50/50 using a control signal C1. As will be discussed with reference to FIG. 3, by selecting a control signal C1 that is higher or lower that the zero dispersion control signal C1 setting, TDC can be set to a positive or negative dispersion level.

Note that while the adjustable couplers 104 and 106 are controlled by a common control signal C1, if desirable separate control signals may be used. Separate controls could be useful, for example, if the couplers have unequal characteristics due to fabrication non-uniformities.

Figure 2:
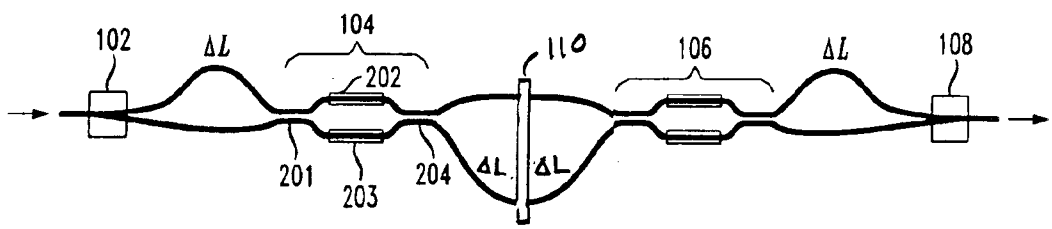
FIG. 2 illustrates the TDC of FIG. 1 where the adjustable couplers are each implemented using an MZI-based adjustable coupler.
Figure 3:
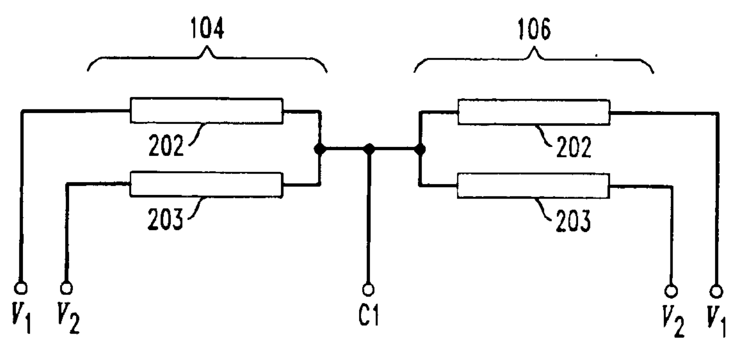
FIG. 3 illustrates the electrical layout for using a single control signal, C1, to control the two MZI-based adjustable couplers of FIG. 2.

FIG. 2 illustrates, in accordance with the present invention, a TDC of FIG. 1 where the adjustable couplers 104 and 106 are implemented using two MZI-based adjustable couplers. As shown, the adjustable couplers 104, 106 are implemented using small MZIs with controllable phase shifters. Each MZI includes a 50/50 fixed evanescent coupler 201, upper phase shifter 202, lower phase shifter 203, and 50/50 fixed evanescent coupler 204. Driving both the lower phase shifters 203 of both MZIs with the same control signal C1 at a first level pushes the dispersion in one direction, and driving both upper phase shifters 202 at a second level pushes the dispersion in the other direction. Depending on the orientations of the main MZIs, there may be a small path-length difference between the two arms in the adjustable coupler MZI. For example, it is advantageous to have a path-length difference of a half wavelength between the two arms in the adjustable coupler. In such a case, if no power is applied to the adjustable couplers, the device has zero dispersion, which could be desirable in the case of a TDC power failure. Note, the adjustable couplers 104 and 106 may have post-fabricated permanent adjustments made to their MZIs so as to more accurately compensate for any variations therein If the phase shifters 202, 203 are thermooptic heaters, then a convenient electrical layout that requires only one control signal C1 to tune to both positive and negative dispersion is shown in FIG. 3. The control signal C1 voltage is varied between the levels V1 and V2, where V2 is greater than V1. When control voltage C1 is at a predetermined zero dispersion level Vz between V1 and V2, then the same current flows through both the upper and lower phase shifters establishing zero dispersion and, hence, adjustable couplers 202, 203 perform a simple cross-connect function as discussed previously. When control signal C1 is at level V1 then no current flows through the upper phase shifters 202 and current flows through the lower phase shifters 203 establishing the maximum amount of a dispersion of a first polarity. When the desired dispersion level is somewhere between zero dispersion level Vz and the maximum first polarity dispersion level V1, then control signal C1 is suitably adjusted to a voltage level between V1 and Vz. At control signal C1 levels between V1 and Vz, the upper 202 and lower 203 phase shifters are operated in a push-pull arrangement. That is, for example, in the upper phase shifter 202 current is increasing while in the lower phase shifter current is decreasing.

When control signal C1 is at level V2 then no current flows through the lower phase shifters 202 and current flows through the upper phase shifters 203 establishing the maximum amount of a dispersion of a second polarity. When the desired dispersion level is somewhere between zero dispersion level Vz and the maximum second polarity dispersion level V2, then control signal C1 is suitably adjusted to a voltage level between Vz and V2. This push-pull operation of the upper 202 and lower 203 phase shifters results in a low worst-case thermooptic power consumption and roughly constant power dissipation for all tuning settings[10].

Figure 4:
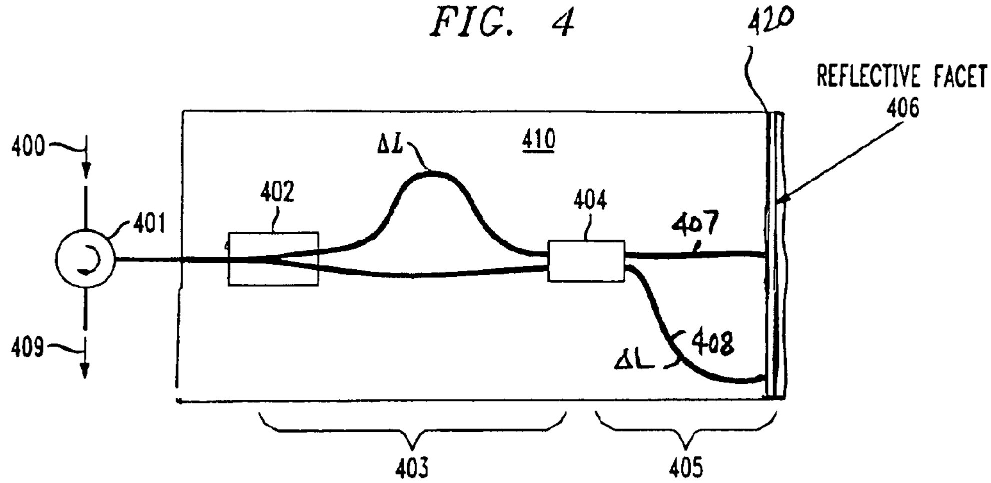
FIG. 4 illustrates, in accordance with the present invention, a reflective design of a tunable dispersion compensator (TDC), including a quarter-wave plate, that uses only one control voltage.

With reference to FIG. 4 there is shown, in accordance with the present invention, a reflective design of a tunable dispersion compensator (TDC) that also uses only one control voltage. Since the TDC arrangement of FIG. 1 is symmetric, as shown in FIG. 4 it can be implemented using a simpler reflective design, at the expense of requiring a circulator. In the reflective design of FIG. 4, MZI 403 performs the function of the first 103 and third 107 MZIs of FIG. 1 and reflective MZI 405 performs the function of MZI 105 of FIG. 1. If a polarization-independence reflective TDC is desired, it can be obtained by adding a quarter-wave plate 410 located in front of the reflective facet 406. Because the optical signals pass twice through the quarter-wave plate 410 it has the same effect as the half-wave plate 110 of FIG. 1.

The operation of the reflective TDC is as follows. An input optical signal at port 400 passes through circulator 401 and is split equally to the two arms of the MZI 403 by the y-branch coupler 412. In the MZI 403, one arm is longer, by ΔL, than the other arm so that when the optical signals are recombined in the first adjustable coupler 404, the amount of light sent to each of the two arms of the reflective MZI 405 depends on the wavelength. The adjustable coupler 404 operates in response to a control signal C1 that controls both the sign and amount of dispersion introduced to the signals outputted from the coupler 404 to the arms 407, 408 of the reflective MZI 405 and also establishes the same sign and amount of dispersion introduced to the signals outputted from the coupler 404 to the arms of MZI 403. Note that the reflective MZI 405 has a reflective facet 406 for reflecting signals received from the two arms 407 and 408 back to these arms. (As noted, if polarization-independence is desired in the reflective TDC, it can be achieved by adding a quarter-wave plate 420 located in front of the reflective facet 406.) Since the signal traverses twice through quarter-wave plate 420, it will have the same effect on the signals as the half-wave plate 110 of FIG. 1. Thus since the signals from arms 407, 408, travel both left-to-right and then right-to-left, the length of arm 407 is need only be ΔL longer than arm 408. The reflected signals then traverse MZI 403 in the right-to-left direction (to act like MZI 107 of FIG. 1) and are combined in y-branch coupler 402 (which acts like y-branch coupler 108 of FIG. 1). The output signal from y-branch coupler 402 then passes through circulator 401 to output port 409. Reflective TDC of FIG. 4, using control signal C1, can control the sign and amount of dispersion introduced to the signal outputted from output port 409 in the same manner that is achieved by TDC of FIG. 1.

Note that one can create an adjustable coupler by other methods than as shown in FIG. 2. For example, instead of two 50/50 evanescent couplers 201 and 204 one can use two 50/50 multi-section evanescent couplers. Multi-section evanescent couplers can give a more accurate 50/50 splitting ratio in the face of wavelength, polarization, and fabrication changes. Another possibility is to use multimode interference couplers.

Likewise, couplers 102 and 108 could be other 50/50 couplers than y-branch couplers. For instance, they could be multimode interference couplers.

FIG. 5A shows the simulated transmissivity, and FIG. 5B shows the simulated group delay characteristic through my TDC at three different settings (0,+π/2, −π/2) of the adjustable couplers(s) of FIGS. 1 and 4. In FIGS. 5A and 5B, the free-spectral range is 25 GHz, at the limits and center of the tuning range. The wavelength is 1550 nm. The marked phases denote the phase difference between the MZI arms in the tunable couplers of FIG. 2. The loss is theoretically zero and does not increase at the channel center as the dispersion is tuned away from zero. At maximum dispersion, there is a transmissivity ripple of 1.25 dB peak-to-peak; the dispersion reaches±2500 ps/nm. The bandwidth is not very wide, though: the transmitter frequency error must be less than~±2.5 GHz (±20 pm). This is achievable for wavelength-locked transmitters. Practically, for 10 Gb/s signals in this case the dispersion is limited to~±2100 ps/nm when the FSR is 25 GHz.

The TDC has a relatively narrow bandwidth. If wavelength-locked transmitter lasers are employed in the system, this bandwidth is generally adequate. However, in some systems, the uncertainty in the laser wavelength may be too large for the TDC bandwidth. In such a case, one can lock of the TDC to the laser wavelength by adjusting phase shifters in the two outermost MZIs. For instance, by increasing the drive to phase shifters in both longer arms of the two outermost MZIs in unison, one can tune the TDC to longer wavelengths. The feedback for the locking can be derived by dithering these phase shifters in the outermost MZIs in unison at a specific frequency and measuring the output power from the TDC using a tap and a photodetector, employing a standard peak-detection feedback control.

Figure 6A:
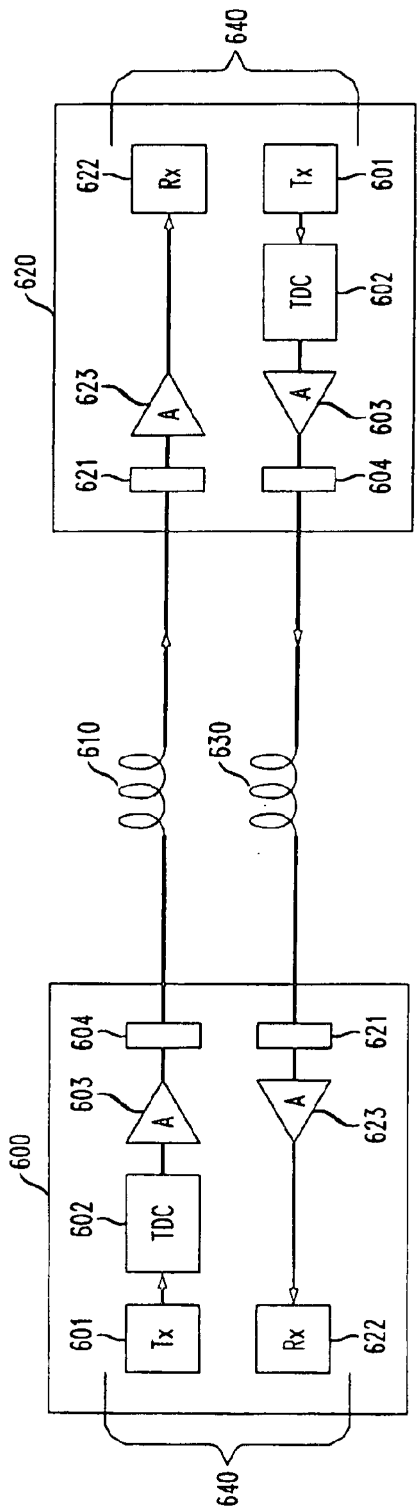
FIGS. 6A and 6B show the use of my TDC in illustrative optical transmission systems.
Figure 6B:
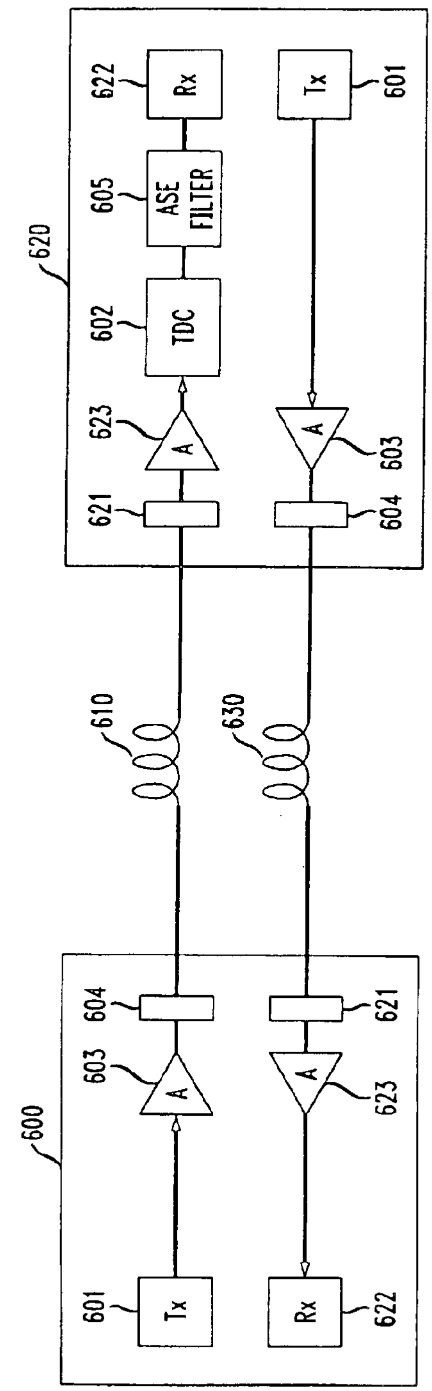

FIGS. 6A and 6B show the use of my TDC in illustrative optical transmission systems. FIG. 6A shows a pre-transmission dispersion compensation system where the first location 600 includes an optical transmitter unit 601, a TDC 602 used for pre-transmission dispersion compensation, an optical amplifier 603, and a wavelength multiplexer 604, if needed. The output signal is sent over the optical facility 610 to a second location 620 that includes a wavelength demultiplexer 621 (if needed), an amplifier 623, and an optical receiver unit 622. Since the illustrative optical transmission systems is bi-directional, the first location also includes a demultiplexer 621 (if needed), an amplifier 623, and an optical receiver unit 622 connected over optical facility 630 to the second location 620 which includes an optical transmitter unit 601, a TDC 602 used for pre-transmission dispersion compensation, an optical amplifier 603, and a multiplexer 604 (if needed). Note that the optical transmitter unit 601 and the optical receiver unit 622 are typically packaged together as a transponder unit 640.

FIG. 6B shows a post-transmission dispersion compensation system where the first location 600 includes an optical transmitter unit 601, an optical amplifier 603, and a wavelength multiplexer 604 (if needed). The output signal is sent over the optical facility 610 to a second location 620 that includes a wavelength demultiplexer 621 (if needed), an amplifier 623, a TDC 602 for post-transmission dispersion compensation, an optical filter 605 [e.g., an amplified spontaneous emission (ASE) filter], and an optical receiver unit 622. Since the illustrative optical transmission systems is bi-directional, the first location also includes a demultiplexer 621 (if needed), an amplifier 623, a TDC 602, an optical filter 605, and an optical receiver unit 622 connected over optical facility 630 to the second location 620 which includes an optical transmitter unit 601, an optical amplifier 603, and a multiplexer 604 (if needed). The order of the TDC 602 and ASE filter 605 could be reversed without affecting system performance.

Note that for a system having a standard single mode fiber (SSMF) optical facility 610 length less than about 80 km, no dispersion compensation is typically needed. For a SSMF optical facility 610 in the range of about 80–135 km the pre-transmission dispersion compensation system of FIG. 6A is preferable. For a SSMF optical facility 610 in the range of about 135–160 km the post-transmission dispersion compensation system of FIG. 6B is preferable.

In the system arrangements of FIGS. 6A and 6B, it should be noted that TDC 602 can be integrated together with one or more of the optical components, such as optical transmitter 601, optical amplifier 603, optical filter 605, wavelength multiplexer 604, wavelength demultiplexer 621, and optical receiver 622. For example, the TDC could be monolithically integrated in InGaAsP with a laser and an optical modulator to form an optical transmitter with built-in dispersion precompensation.

Figure 7A:
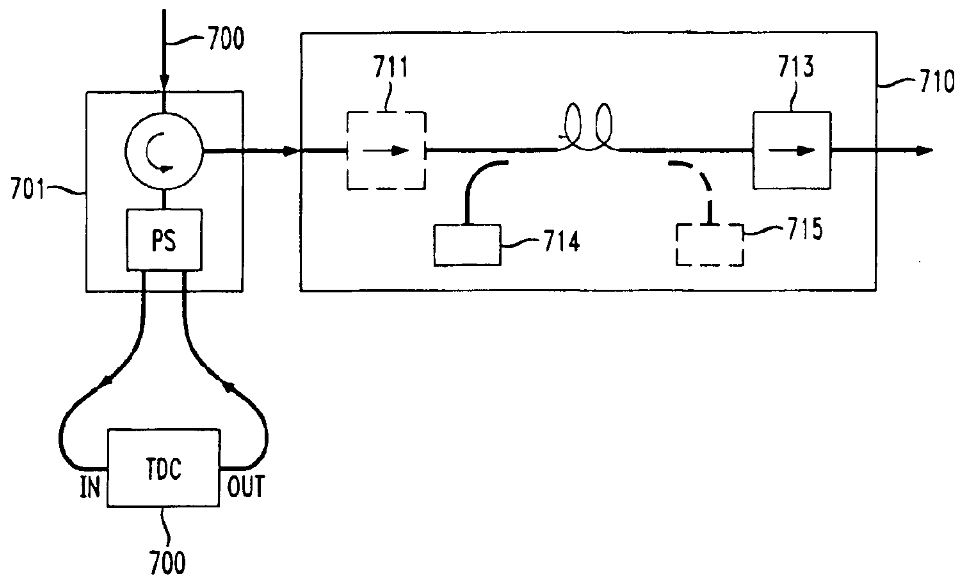
FIGS. 7*a* and 7B show my TDC arranged together with an Erbium amplifier.

FIG. 7A shows on illustrative design of my TDC arranged together with an Erbium amplifier. In this arrangement, the TDC 700 is arranged in a polarization diversity scheme, in order to make the TDC function polarization independent even if the TDC device itself is polarization dependent, in which polarization-maintaining fibers (PMFs) 702 and 703 are spliced to a circulator/polarization splitter (CPS) 701 of the type described in Ref.[11]. In operation, an input optical signal 700 received by the circulator is split in the polarization splitter and coupled via PMF 702 to TDC 700. The dispersion compensated optical signal from TDC 700 is coupled via PMF 703 to polarization splitter and the circulator to Erbium amplifier 710. The circulator/polarization splitter (CPS) 701 eliminates the need for an input signal isolator 711 in Erbium amplifier 710. Thus, the Erbium amplifier 710 need only include the Erbium fiber output isolator 713 and either forward pump and coupler 714 or back pump and coupler 714. It should be noted that since the TDC of FIG. 1 has only three stages, it can relatively simply be made polarization independent on its own and therefore does not need the polarization diversity scheme using PMFs 702 and 703 and circulator/polarization splitter (CPS) 701.

Figure 7B:
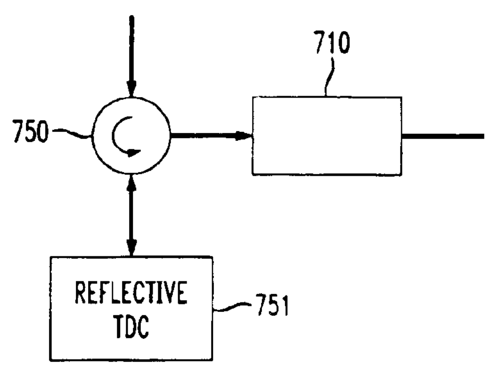

FIG. 7B shows a polarization independent reflective TDC 751 of FIG. 4 arranged together with Erbium amplifier 710. A circulator 750 is used to couple the input optical signal 700 to TDC 751 and to couple the dispersion compensated optical signal to Erbium amplifier 710.

Figure 8:
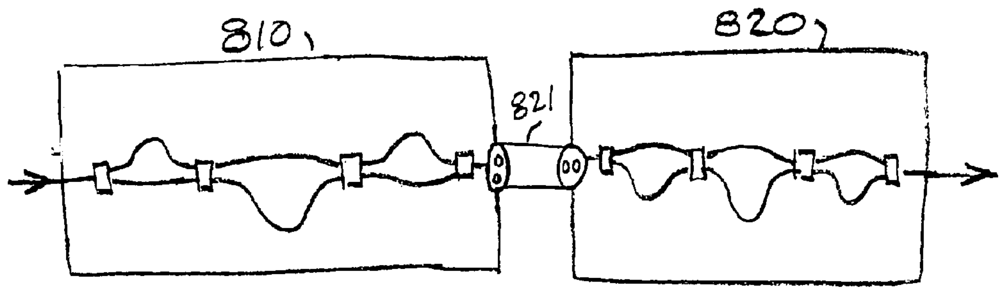
FIG. 8 shows a cascaded embodiment of two TDCs.

FIG. 8 shows two cascaded TDCs 810 and 820 that are driven with a single control. This cascaded TDC acts a like a single TDC with still a single control and yet a larger dispersion adjustment range. The two TDCs may be integrated onto the same PLC or be on separate PLCs. If they are both on a single PLC, a half-wave plate may optionally be placed between the two TDCs in order to reduce the polarization dependency. If they are on separate PLCs, a piece of polarization-maintaining fiber 821 with its slow axis oriented parallel to one PLC and its fast axis oriented parallel to the other PLC may optionally be place between the two TDCs in order to reduce the polarization dependency.

Figure 9:
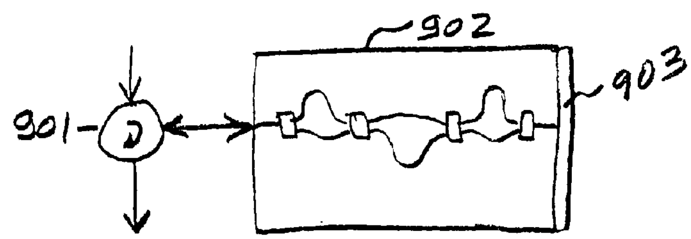
FIG. 9 shows a reflective arrangement for providing a cascaded arrangement of two TDCs.

FIG. 9 shows a reflective arrangements for providing a cascaded arrangement of two TDCs as in FIG. 8. The circulator 901 operates in the same manner as circulator 401 of FIG. 4. The TDC 902 operates in the same manner as the TDC unit described in FIG. 1. The reflective facet 903 operates in the same manner as reflective facet 406 of FIG. 4. Since the signal traverses twice through TDC 902 it the reflective arrangement of FIG. 9 functions in the same manner as two cascaded TDCs as in FIG. 8. Furthermore, one can place a quarter-wave plate between the PLC and reflector, if so desired, to reduce the overall polarization dependence.

With reference to FIG. 1, I illustratively describe the initial setup of an exemplary prototype TDC that was made and tested. The TDC was temperature controlled with a thermoelectric cooler. Because the path-length differences in MZIs 103, 105, and 107 are so large, after fabrication the relative phase in each MZI stage was random. Thus the MZI arms are permanently trimmed using hyper-heating[12]. The procedure is as follows: with no power applied, the adjustable couplers 104, 106 are set for 100/0 (i.e., the couplers look like waveguide crossings in FIG. 1), and the transmissivity spectrum is flat. Then the left coupler 104 is adjusted to be 0/100, causing the transmissivity spectrum to have a full sinusoidal ripple. The position of a valley is marked. Then the left coupler 104 is restored to 0/100, and the right coupler 106 adjusted to 0/100. The path-length differences in the two outermost MZIs 103, 107 are correct when the ripples from the two cases are wavelength-aligned. If they are not, one of the outer MZIs' arms is hyperheated to make them aligned. Then, with both couplers 104, 106 at 100/0, the center MZI 105 arms are hyperheated in order to maximize the transmissivity. After trimming, the fiber-to-fiber loss of the TDC apparatus, including the CPS, is 4.0 dB.

Although the above discussion focused on using the TDC to compensate 10-Gb/s signals, it can be used to compensate other bit rates, such as 40 Gb/s, by choosing an appropriate □L.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

References

[1] C. K. Madsen, G. Lenz, A. J. Bruce, M. A. Cappuzzo, L. T. Gomez, and R. E. Scotti, "Integrated all-pass filters for tunable dispersion and dispersion slope compensation," IEEE Photon. Technol. Lett., vol. 11, pp. 1623–1625, December 1999.

[2] M. Shirasaki, "Chromatic dispersion compensator using virtually imaged phased array," IEEE Photon. Technol. Lett., vol. 9, pp. 1598–1600, December 1997.

[3] Koichi Takiguchi, Kaname Jinguji, Katsunari Okamoto, and Yasuji Ohmori, "Variable group-delay dispersion equalizer using lattice-form programmable optical filter on planar lightwave circuit," IEEE J. Sel. Topics in Quant. Electron., vol. 2., pp. 270–276, 1996.

[4] M. Bohn, F. Horst, B. J. Offrein, G. L. Bona, E. Meissner, and W. Rosenkranz, "Tunable dispersion compensation in a 40 Gb/s system using a compact FIR lattice filter in SiON technology," European Conference on Optical Communication, paper 4.2.3, 2002.

[5] S. Suzuki, T. Takiguchi, and T. Shibata, "Low-loss integrated-optic dynamic chromatic dispersion compensators using lattice-form planar lightwave circuits," in Optical Fiber Communication Conf. Digest, pp. 176–177, 2003.

[5A] J. Gehler, R. Wessel, F. Buchali, G. Thielecke, A. Heid, H. Blow, "Dynamic Adaption of a PLC Residual Chromatic Dispersion Compensator at 40 Gb/s" in OFC 2003, Vol. 2, pp. 750–751.

[5B] R. Kasahara, M. Itoh, Y. Hida, T. Saida, Y. Inoue, and Y. Hibino, "Birefringence compensated silica-based waveguide with undercladding ridge," Electron. Lett., vol. 38, pp. 1178–1179, Sep. 26, 2002.

[5C] Hiroshi Takahashi, Yoshinori Hibino, and Isao Nishi, "Polarization-insensitive arrayed-waveguide grating wavelength multiplexer on silicon," Opt. Lett., vol. 17, pp. 499–501, Apr. 1, 1992.

[5D] K. Takiguchi, K. Okamoto, Y. Inoue, M. Ishii, K. Moriwaki, and S. Ando, "Planar lightwave circuit dispersion equaliser module with polarization insensitive properties," Electron. Lett., vol. 31, pp. 57–58, 1995.

[5E] K. Moriwaki, M. Abe, Y. Inoue, M. Okuno, and Y. Ohmori, "New silica-based 8×8 thermo-optic matrix switch on Si that requires no bias power," in Optical Fiber Conf. Digest, pp. 211–212, 1995.

[6] D. J. Moss, M. Lamont, S. McLaughlin, G. Randall, P. Colbourne, S. Kiran, and C. A. Hulse, "Tunable dispersion and dispersion slope compensators for 10 Gb/s using all-pass multicavity etalons," IEEE Photon. Technol. Lett., vol. 15, pp. 730–732, May 2003.

[7] C. R. Doerr, L. W. Stulz, S. Chandrasekhar, L. Buhl, and R. Pafchek, "Multichannel integrated tunable dispersion compensator employing a thermooptic lens," Optical Fiber Communication Conference, postdeadline paper FA6-1, 2002.

[8] D. Nielson, R. Ryf, D. Marom, S. Chandrasekhar, F. Pardo, V. Aksyuk, M. Simon, and D. Lopez, "Channelized dispersion compensator with flat pass bands using an array of deformable MEMS mirrors," OFC postdeadline paper PD29, 2003.

[9] T. Ozeki, "Optical equalizers," Opt. Lett., vol. 17, pp. 375–377, March 1992.

[10] C. R. Doerr, L. W. Stulz, R. Pafchek, and S. Shunk, "Compact and low-loss manner of waveguide grating router passband flattening and demonstration in a 64-channel blocker/multiplexer," IEEE Photon. Technol. Lett., vol. 14, pp. 56–58, January 2002.

[11] C. R. Doerr, K. W. Chang, L. W. Stulz, R. Pafchek, Q. Guo, L. Buhl, L. Gomez, M. Cappuzzo, and G. Bogert, "Arrayed waveguide dynamic gain equalization filter with reduced insertion loss and increased dynamic range," IEEE Photon. Technol. Lett., vol. 13., pp. 329–331, April 2001.

[12] K. Moriwaki, M. Abe, Y. Inoue, M. Okuno, and Y. Ohmori, "New silica-based 8×8 thermo-optic matrix switch on Si that requires no bias power," in Optical Fiber Conf. Digest, pp. 211–212, 1995.

What is claimed is:

1. A tunable chromatic optical signal dispersion compensator comprising three cascaded Mach-Zehnder interferometers, MZIs, a first MZI including a fixed 50/50 coupler for receiving an input optical signal, a second MZI including a first adjustable coupler that is shared with the first MZI and a second adjustable coupler that is shared a third MZI, the second MZI further including a half-wave plate positioned across the midpoints of the two path lengths of the second MZI so as to exchange the TE and TM polarizations of the optical signals passing through the two path lengths, the third MZI including a fixed 50/50 coupler for outputting a dispersion-adjusted output optical signal and wherein said first and second shared adjustable couplers are adjusted with equal coupling ratios using a single control signal to provide adjustable dispersion compensation to the output signal.

2. A tunable chromatic optical signal dispersion compensator comprising three cascaded Mach-Zehnder interferometers, MZIs, a first MZI including a fixed 50/50 coupler for receiving an input optical signal, a second MZI including a first adjustable coupler that is shared with the first MZI and a second adjustable coupler that is shared a third MZI, the second MZI further including a half-wave plate positioned across the midpoints of the two path lengths of the second MZI so as to exchange the TE and TM polarizations of the optical signals passing through the two path lengths, the third MZI including a fixed 50/50 coupler for outputting a dispersion-adjusted output optical signal, wherein said first and second shared adjustable couplers are adjusted with equal coupling ratios using a single control signal to provide adjustable dispersion compensation to the output signal, and wherein the first and third MZIs have a path-length difference ΔL and the second MZI has a path-length difference 2ΔL.

3. The optical signal dispersion compensator of claim 1 wherein when the two adjustable couplers are set to a 100/0 coupling ratio, the optical signal dispersion compensator has zero dispersion arid wherein the dispersion can be tuned positive or negative by adjusting the two adjustable couplers towards a 50/50 coupling ratio.

4. The optical signal dispersion compensator of claim 1 wherein each of the two adjustable couplers is implemented using an MZI with phase shifters.

5. The optical signal dispersion compensator of claim 4 wherein the MZI in the adjustable couplers has a zero-electrical-power path-length difference of a half wavelength so that when no electrical power is applied the compensator exhibits zero dispersion.

6. The optical signal dispersion compensator of claim 4 wherein the phase shifters of each of the two adjustable couplers uses thermooptic heaters operated in a push-pull manner by the single control signal.

7. The optical signal dispersion compensator of claim 1 implemented as a planar optical integrated circuit.

8. The optical signal dispersion compensator of claim 1 wherein the fixed 50/50 couplers are y-branch couplers.

9. The optical signal dispersion compensator of claim 1 being integrated as part of an optical apparatus consisting of one or more of the following optical components an optical transmitter, an optical amplifier, an optical filter, a wavelength multiplexer, a wavelength demultiplexer, and an optical receiver.

10. The optical signal dispersion compensator of claim 1 being used in a multi-wavelength channel system, the optical signal dispersion compensator having a free-spectral range equal to the system channel spacing divided by an integer.

11. A polarization independent tunable chromatic optical signal dispersion compensator, TDC, apparatus comprising a cascaded arrangement of a first TDC and a second TDC, each TDC comprising a first MZI including a fixed 50/50 coupler for receiving an input optical signal, a second MZI including a first adjustable coupler that is shared with the first MZI and a second adjustable coupler that is shared a third MZI, and the third MZI including a fixed 50/50 coupler for outputting a dispersion-adjusted output optical signal and wherein said first and second shared adjustable couplers in the first and TDC and the second TDC are all adjusted with equal coupling ratios using a single control signal to provide adjustable dispersion compensation to the output signal.

12. The cascaded TDC of claim 11, wherein a half wave plate is positioned between the two TDCs in order to achieve low polarization dependence.

13. A reflective TDC comprising of a first MZI including a fixed 50/50 coupler for receiving an input optical signal, a second MZI including a first adjustable coupler that is shared with the first MZI and a second adjustable coupler that is shared with a third MZI, and said third MZI including a fixed 50/50 coupler for outputting a dispersion-adjusted output optical signal, to a reflector such that the signal passes twice through the first, second and third MZIs.

14. The reflective TDC of claim 13 wherein a quarter wave plate is positioned between the TDC and the reflector in order to achieve low polarization dependence.

* * * * *